March 19, 1935.  H. R. RICARDO  1,994,729
CRANKSHAFT FOR INTERNAL COMBUSTION ENGINES
Filed April 7, 1934
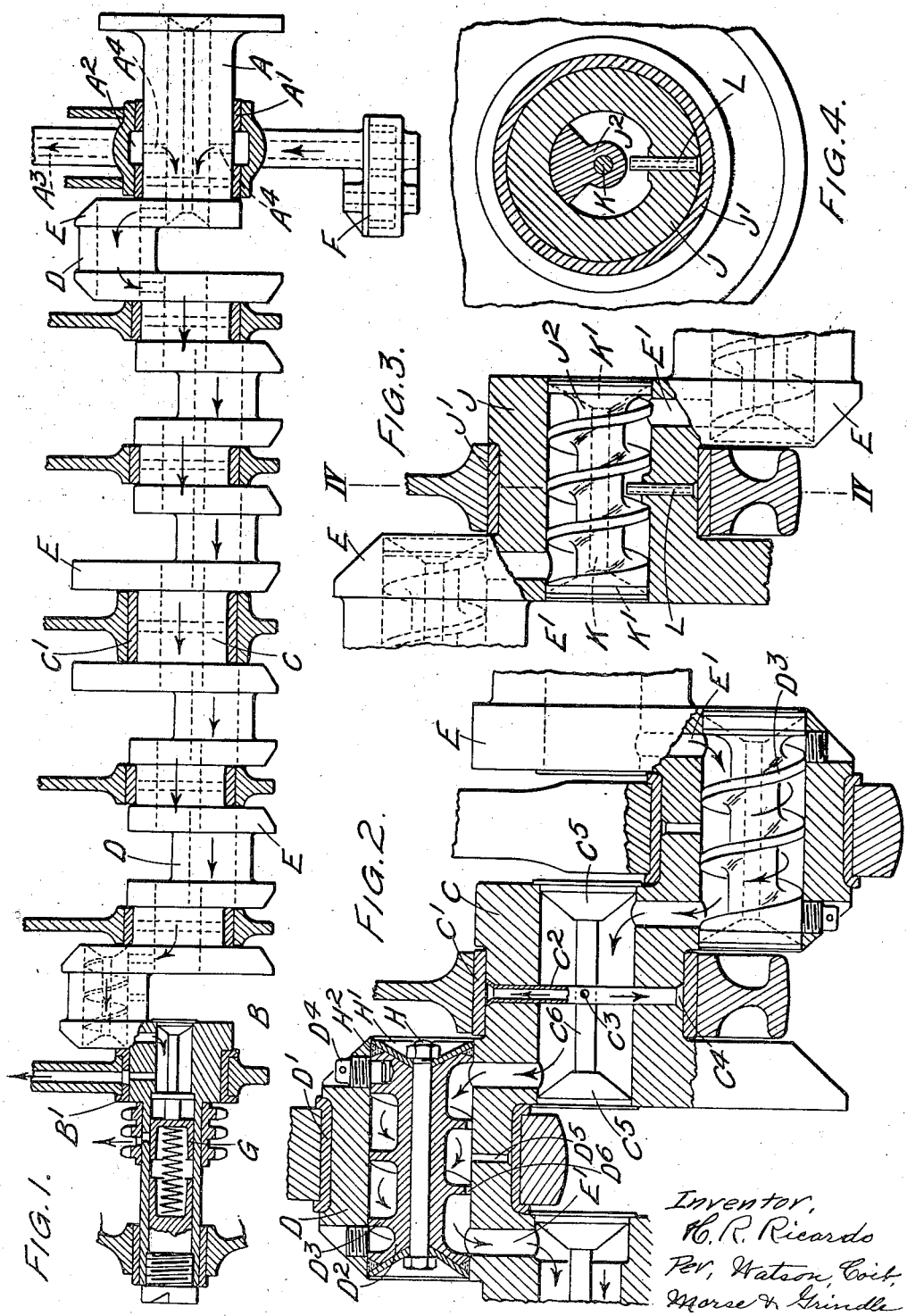

Patented Mar. 19, 1935

1,994,729

UNITED STATES PATENT OFFICE 1,994,729

CRANKSHAFT FOR INTERNAL COMBUSTION ENGINES

Harry Ralph Ricardo, London, England

Application April 7, 1934, Serial No. 719,579
In Great Britain April 26, 1933

17 Claims. (Cl. 184—6)

This invention relates to crankshafts for internal combustion engines and in particular to arrangements for lubricating and cooling the crankshaft of a high speed internal combustion engine.

In high speed engines heat tends to be generated by friction at the crank pin and journal bearings at a greater rate than it can be dissipated by conduction along the crankshaft or connecting rods. Thus unless some means is provided for removing the heat, the bearings may reach a temperature which will impair the lubrication or greatly reduce the strength of the white metal and in some cases result in melting of the bearing.

In order to cool the crankshaft bearings, the crank pins and journals may be made hollow and connected by means of passages through the webs, cooling liquid being fed through the shaft either from one end to the other or from the middle to the two ends or vice versa.

With such an arrangement air entrained in the liquid tends to be centrifugally separated out from the liquid and to accumulate at certain points in the crankshaft so that columns of liquid subject to centrifugal force are out of balance hydraulically and the lack of balance opposes the flow of liquid through the crankshaft, thus necessitating considerable additional pressure to force an adequate supply of cooling liquid through the crankshaft.

One object of the invention is to enable a high velocity of liquid flow to be maintained through the bores of the journals and crank pins so as to increase the cooling effect of the liquid, at the same time preventing centrifugal separation of sludge and suspended solid matter from the liquid.

To this end according to the invention, a crankshaft for an internal combustion engine has a hollow crank pin or journal for the passage of liquid lubricant and a guide therein which causes the liquid to follow a helical path as it flows longitudinally through the pin or journal. Conveniently the pin or journal has in it a cylindrical bore and the guide member fits therein. The latter may be in the form of a helical rib or be a helically ribbed member inserted in the bore.

Preferably a lubricating passage is formed through the wall of the crank pin at that part of it nearer to the crankshaft axis. The purpose of this is to prevent an excessive flow of lubricating liquid taking place, owing to centrifugal force. With the arrangement mentioned, escape of liquid through the lubricating passage is opposed by the centrifugal force due to rotation of the crank pin about the crankshaft axis.

According to a further feature of the invention the hollow journal has a passage which is carried through the wall of the journal with an opening at the inner end of this passage in a part thereof projecting into or extending across the bore of the journal.

In the accompanying drawing—

Figure 1 is a side elevation partly in section of a crankshaft embodying one construction according to the invention, Figure 2 illustrates in section a part of the crankshaft shown in Figure 1, but on an enlarged scale, Figure 3 is a section similar to Figure 2 of an alternative construction of journal, and Figure 4 is a section on the line IV—IV of Figure 3.

In the construction illustrated in Figures 1 and 2 the crankshaft comprises end journals A, B rotatable in bearings $A^1$, $B^1$, intermediate journals C rotatable in bearings $C^1$ and crank pins D rotatable in big end bearings $D^1$ (Figure 2).

The journals A, B, C and crank pins D are hollow as shown and communicate with each other through passages $E^1$ drilled in the crank webs E. The crankshaft thus has a continuous passage for lubricant from one end of the shaft through the journals and crank pins, to the other end of the shaft. A supply of oil is fed under pressure by a pump F to one end of the shaft and a lightly loaded relief valve G is provided at the other end to impose slight pressure on the bulk supply for the lubrication of other parts of the engine.

With a view to causing the air to flow at a high velocity round the whole internal circumference of each crank pin D and thus to ensure more intensive and uniform cooling and also to prevent centrifugal separation of sludge or solid matter from the oil, the hollow interior of each crank pin D is furnished with a plug $D^2$. The plug $D^2$ is provided with a helically arranged rib $D^3$, the circumferential edge of which abuts against the inner cylindrical surface of the hollow crank pin as shown, the plug $D^2$ being held in position by a grub screw $D^4$ conveniently occupying the threaded outer end of one of the holes necessitated for drilling the passages $E^1$ in the crank webs E. Each plug $D^2$ has an axial bore through which extends a bolt H for holding in position dished conical washers $H^1$ which cooperate with packing rings $H^2$ to seal the ends of the hollow crank pin D. If desired the bolt H and plug $D^2$ may be formed as a single unit.

A passage $D^5$ is provided in the wall of each crank pin D to allow a small proportion of oil flowing through the hollow pin to pass to the bearings $D^1$. In this way lubrication is provided for the outer bearing surface of each crank pin but, as will be seen from Figure 2, since each lubricating passage $D^5$ is provided in that part of the crank pin D nearest to the crank axis, the oil pressure in each passage $D^5$ due to centrifugal force is small. Further the parts of the helical passage formed between helices of the rib $D^3$ are in communication with each other through openings $D^6$ cut in the helices $D^3$ at those parts nearest to the crank axis. In this way the formation of air locks in those parts of the helical passage nearest to the crankshaft axis tends to be prevented.

The pump F delivers lubricant to an annular chamber $A^2$ formed in the bearing $A^1$ and from which lubricant can flow through a feed pipe $A^3$ and a pressure relief valve (not shown) to other parts of the engine including the cam shaft. The liquid lubricant flows from the annular chamber $A^2$ radially inwards through lubricating passages $A^4$, extending radially through the wall of the journal A, into the interior of the journal to the passage $E^1$ in the adjacent web E and thence through the associated crank pin D. The helical rib $D^3$ causes the lubricant to flow at high velocity around the whole interior surface of the crank pin D and thus ensures efficient cooling. Furthermore the helical path followed by the oil in passing through the crank pin tends to prevent centrifugal separation of sludge or solid matter from the lubricant.

With a view to ensuring that the oil fed to each journal bearing $A^1$, $B^1$, $C^1$ is taken from the inner part of the space within the journal from which any suspended matter will have been removed centrifugally, and also to vent any air which may have become entrained with the oil, each journal is furnished with two oppositely arranged passages which receive the two ends of a tube as shown at $C^2$ (Figure 2) with an opening or openings $C^3$ at or about the centre of the length of the tube $C^2$, that is to say on or near the axis of the crank shaft. The outer ends of the tube $C^2$ communicate with an annular space $C^4$ formed between the journal C and the bearing $C^1$. The ends of each journal C are closed by conical washers $C^5$ held in position by a pin $C^6$ past which the tube $C^2$ extends. Alternatively the pin $C^6$ may be slightly bent or kinked to allow the tube $C^2$ to pass diametrically across the interior of the journal thus bringing the opening or openings $C^3$ nearer to the axis of rotation.

In this way since sediment or solid matter will tend to be maintained near the inner surface of the hollow journal, that is to say at parts more remote from the opening $C^3$, clean oil only will flow to the annular space $C^4$. In addition air, which if present will tend to collect at the centre of rotation, will be vented through the pipe $C^2$.

Instead of a pipe extending right across the interior of the journal as described with reference to Figure 2, one or more short pipes or hollow bosses may project into the journal either radially or obliquely, the opening at the inner end of each pipe or hollow boss lying near the centre of rotation of the journal. This arrangement is particularly suitable when the central portion of the journal is occupied by a bolt such as the bolt $C^6$ or when, as may be the case, the journal is furnished with a helical plug as described with reference to the crank pin D. Thus, as illustrated for example in Figures 3 and 4, a hollow journal J rotatable within a bearing $J^1$ is furnished with a helical plug $J^2$ through which passes a bolt K whereby conical washers $K^1$ are held in position to seal the ends of the hollow journal. If desired the bolt K and plug $J^2$ may be formed as a unit. A lubricating tube L passes through one wall of the journal and opens at its inner end near the plug $J^2$, that is to say at a substantial distance from the inner surface of the journal J through which the tube L passes. The lubricant flowing from the passage $E^1$ in one of the adjacent crank webs E thus flows at a high velocity around the whole interior surface of the journal while the tendency for sludge or solid matter which has been centrifugally separated to settle within the journal, is prevented. Furthermore, clean oil only will pass through the lubricating tube L whilst air will also be vented from the interior of the journal.

Since with the construction as above described the quantity of lubricant from the crank shaft which passes to and has a cooling effect on the engine pistons will tend to be reduced, it may be desirable, where the persent invention is applied to engines of large size and/or subject to high continuous duty, to provide a supplementary supply of lubricant as for instance by causing oil jets to play externally on the big end bearings, or in any other way which will result in this supplementary lubricant reaching the inside of the pistons in the form of mist or spray. The quantity of supplementary lubricant supplied to the pistons may be varied approximately in accordance with variations in the load on the engine.

It will be understood that the constructions above described are given by way of example only and that details may be modified. For example, the oil, instead of being fed to one end of the hollow crankshaft, may be fed to a point in the length thereof and a relief valve provided at each end. Further, instead of the helical guides being constituted by solid plugs any other suitable arrangement may be employed such, for example, as a hollow helix, resembling a helical spring and arranged on or near the inner surface of the bore of the journal or crank pin. When a lubricating pipe is provided across the bore of the journal the pipe need not extend diametrically across the bore but may extend on a chord across the interior of the journal, as, for example, in those cases where a bolt lies on the axis of the bore of the journal. Instead of providing a short pipe extending radially into the bore of the journal, this pipe may project in a direction oblique to the axis but having a component towards it. Whilst it is preferred to employ a short pipe with this construction it will be understood that a short inwardly projecting boss may be formed on the interior of the journal, such boss having a bore leading through the wall of the journal.

Though in the constructions above described a helical guide and lubricating passage have been provided for intermediate journals any or all of the journals, including the main or end journals, may be provided with helical guides or lubricating tubes or with both helical guides and lubricating tubes.

What I claim as my invention and desire to secure by Letters Patent is:—

1. A crank shaft for an internal combustion engine including in combination at least one hollow journal through which liquid lubricant can flow longitudinally, and means within the journal whereby the liquid is caused to follow a helical path as it flows longitudinally through and within the hollow journal.

2. A crank shaft for an internal combustion engine including in combination at least one hollow journal through which liquid lubricant can flow longitudinally, and a guide member within the hollow journal, said guide member causing the liquid to follow a helical path as the liquid flows longitudinally through and within the hollow journal.

3. A crank shaft for an internal combustion engine including in combination at least one hollow journal through which liquid lubricant can flow longitudinally, and helically arranged guide surfaces within the journal whereby the liquid is caused to follow a helical path as it flows longitudinally through and within the hollow journal.

4. A crank shaft for an internal combustion engine including in combination at least one hollow journal having a cylindrical bore through which liquid lubricant can flow longitudinally, a guide plug arranged within the bore, and helically arranged guide surfaces on the guide plug whereby the liquid is caused to follow a helical path as it flows longitudinally through and within the hollow journal.

5. A crank shaft for an internal combustion engine including in combination at least one hollow journal having a cylindrical bore through which liquid lubricant can flow longitudinally, a guide plug arranged within the bore, and a helical rib on the outer surface of the guide plug whereby the liquid is caused to follow a helical path as it flows longitudinally through and within the hollow journal.

6. A crank shaft for an internal combustion engine including in combination at least one hollow crank-pin through which liquid lubricant can flow longitudinally, and means within the crank-pin whereby the liquid is caused to follow a helical path as it flows longitudinally through and within the hollow crank-pin.

7. A crank shaft for an internal combustion engine including in combination at least one hollow crank-pin through which liquid lubricant can flow longitudinally, and a guide member within the hollow crank-pin, said guide member causing the liquid to follow a helical path as the liquid flows longitudinally through and within the hollow crank-pin.

8. A crank shaft for an internal combustion engine including in combination at least one hollow crank-pin through which liquid lubricant can flow longitudinally, and helically arranged guide surfaces within the crank-pin whereby the liquid is caused to follow a helical path as it flows longitudinally through and within the hollow crank-pin.

9. A crank shaft for an internal combustion engine including in combination at least one hollow crank-pin having a cylindrical bore through which liquid lubricant can flow longitudinally, a guide plug arranged within the bore, and helically arranged guide surfaces on the guide plug whereby the liquid is caused to follow a helical path as it flows longitudinally through and within the hollow crank-pin.

10. A crank shaft for an internal combustion engine including in combination at least one hollow crank-pin having a cylindrical bore through which liquid lubricant can flow longitudinally, a guide plug arranged within the bore, and a helical rib on the outer surface of the guide plug whereby the liquid is caused to follow a helical path as it flows longitudinally through and within the hollow crank-pin.

11. A crank shaft for an internal combustion engine including in combination at least one hollow crank-pin through which liquid lubricant can flow longitudinally, means within the hollow crank-pin whereby the liquid is caused to follow a helical path as it flows longitudinally through the pin, and at least one passage through which liquid can flow direct through and within the interior of the crank-pin at that part of the inner surface thereof which lies nearest to the axis of the crank shaft.

12. A crank shaft for an internal combustion engine including in combination at least one hollow crank-pin having a cylindrical bore through which liquid lubricant can flow longitudinally, a guide plug arranged within the bore, a helical rib on the outer surface of the guide plug whereby liquid is caused to follow a helical path as it flows longitudinally through and within the hollow crank-pin, and at least one passage adjacent to the outer edges of the helical rib through which passage lubricant can flow direct longitudinally through the crank-pin.

13. A crank shaft for an internal combustion engine including in combination at least one hollow journal through which liquid lubricant can flow longitudinally, means within the journal whereby the liquid is caused to follow a helical path as it flows longitudinally through the hollow journal, at least one hollow crank-pin through which liquid lubricant can flow longitudinally, and means within the crank-pin whereby the liquid is caused to follow a helical path as it flows longitudinally through and within the hollow crank pin.

14. A crank shaft for an internal combustion engine including in combination at least one hollow journal having a cylindrical bore through which liquid lubricant can flow longitudinally, a guide plug arranged within the bore, helically arranged guide surfaces on the guide plug whereby the liquid is caused to follow a helical path as it flows longitudinally through the hollow journal, at least one hollow crank-pin having a cylindrical bore through which liquid lubricant can flow longitudinally, a guide plug arranged within the bore of the crank-pin, and helically arranged guide surfaces on the guide plug whereby the liquid is caused to follow a helical path as it flows longitudinally through and within the hollow crank-pin.

15. A crankshaft for an internal combustion engine including in combination at least one hollow journal through which liquid lubricant can flow longitudinally, and a guide member within the journal whereby the liquid lubricant is caused to follow a helical path as it flows through and within the journal, said journal having a lubricating passage passing through the wall thereof with the opening at the inner end of said passage lying at a substantial distance from the inner surface of the journal.

16. A crankshaft for an internal combustion engine including in combination at least one hollow journal through which liquid lubricant can flow longitudinally, a guide plug arranged within the journal, helical ribs on the guide plug whereby the liquid lubricant is caused to follow a helical path as it flows through and within the journal, a part carried by said journal and projecting into the interior thereof, said inwardly projecting part having a lubricating passage which passes through the wall of the journal with the opening at the inner end of the lubricating passage lying adjacent to the outer surface of the plug between the helical ribs thereon.

17. A crankshaft for an internal combustion engine including in combination at least one hollow journal through which liquid lubricant can flow longitudinally, a hollow guide plug arranged within the journal, helical ribs on the guide plug whereby the liquid lubricant is caused to follow a helical path as it flows through and within the journal, detachable members for sealing the two ends of the hollow journal; a bolt extending through the hollow guide plug and retaining said sealing members in position, a part carried by the journal and projecting into the interior thereof, said inwardly projecting part having a lubricating passage which passes through the wall of the journal with the opening at the inner end of the lubricating passage lying adjacent to the outer surface of the plug between the helical ribs.

HARRY RALPH RICARDO.